(12) United States Patent
Yang

(10) Patent No.: US 10,542,433 B2
(45) Date of Patent: Jan. 21, 2020

(54) CONNECTION ESTABLISHMENT METHOD, DEVICE, AND SYSTEM

(71) Applicant: Huawei Technologies Co., Ltd., Shenzhen (CN)

(72) Inventor: Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 15/588,496

(22) Filed: May 5, 2017

(65) Prior Publication Data

US 2017/0245149 A1 Aug. 24, 2017

Related U.S. Application Data

(63) Continuation of application No. PCT/CN2014/090585, filed on Nov. 7, 2014.

(51) Int. Cl.
*H04W 12/00* (2009.01)
*H04W 12/08* (2009.01)
(Continued)

(52) U.S. Cl.
CPC ......... *H04W 12/08* (2013.01); *H04L 63/0876* (2013.01); *H04L 63/10* (2013.01);
(Continued)

(58) Field of Classification Search
CPC .... H04L 63/10; H04L 63/0876; H04W 12/06; H04W 12/08; H04W 76/10; H04W 4/08
See application file for complete search history.

(56) References Cited

U.S. PATENT DOCUMENTS

2009/0131084 A1  5/2009  Comstock et al.
2009/0216887 A1  8/2009  Hertle et al.
(Continued)

FOREIGN PATENT DOCUMENTS

CN   101640887 A   2/2010
CN   101668325 A   3/2010
(Continued)

OTHER PUBLICATIONS

"3rd Generation Partnership Project; Technical Specification Group Services and System Aspects; Group Communication System Enablers for LTE (GCSE_LTE) (Release 12)," TS 22.468 V12.0.0, XP50902101A, pp. 1-22, 3rd Generation Partnership Project, Valbonne, France (Jun. 2013).
(Continued)

*Primary Examiner* — Beemnet W Dada
(74) *Attorney, Agent, or Firm* — Leydig, Voit & Mayer, Ltd.

(57) ABSTRACT

A connection establishment method, a device, and a system are disclosed to resolve a problem in the prior art that because first user equipment is connected to any user equipment, security of a relay service function is poor. A specific solution is: receiving, by first user equipment, a served object group identifier sent by a network device; receiving discovery information sent by second user equipment; and when determining that an identifier of a second group is included in the served object group identifier, establishing a connection between the first user equipment and the second user equipment according to a data link layer ID of the second user equipment.

16 Claims, 6 Drawing Sheets

(51) Int. Cl.
  *H04W 4/08* (2009.01)
  *H04L 29/06* (2006.01)
  *H04W 8/00* (2009.01)
  *H04W 12/06* (2009.01)
  *H04W 76/10* (2018.01)
  *H04W 88/04* (2009.01)

(52) U.S. Cl.
  CPC ............. *H04W 4/08* (2013.01); *H04W 8/005* (2013.01); *H04W 12/06* (2013.01); *H04W 76/10* (2018.02); *H04W 88/04* (2013.01)

(56) References Cited

U.S. PATENT DOCUMENTS

| | | | |
|---|---|---|---|
| 2012/0108220 A1 | 5/2012 | Rotbart et al. | |
| 2012/0120924 A1 | 5/2012 | Montojo et al. | |
| 2014/0026207 A1* | 1/2014 | Wang | H04L 41/28 726/12 |
| 2018/0103417 A1* | 4/2018 | Choi | H04W 4/08 |

FOREIGN PATENT DOCUMENTS

| | | |
|---|---|---|
| CN | 101931955 A | 12/2010 |
| CN | 102469015 A | 5/2012 |
| CN | 102811497 A | 12/2012 |
| EP | 3107349 A1 | 12/2016 |
| KR | 20070020838 A | 2/2007 |
| RU | 2010103158 A | 8/2011 |
| RU | 2460231 C2 | 8/2012 |
| WO | WO 2014166440 A1 | 10/2014 |

OTHER PUBLICATIONS

"Support of ProSe Group communication on UE-to-Network Relay," SA WG2 Meeting #101bis, San Jose Del Cabo, Mexico, S2-140666, pp. 1-4, XP50770223A, 3rd Generation Partnership Project, Valbonne, France (Feb. 17-21, 2014).

"3$^{rd}$ Generation Partnership Project; Technical Specification Group Services and System Aspects; Study on architecture enhancements to support Proximity-based Services (ProSe) (Release 12)," 3GPP TR 23.703, V12.0.0, pp. 1-324 , 3$^{rd}$ Generation Partnership Project, Valbonne, France (Feb. 2014).

"3rd Generation Partnership Project; Technical Specification Group Services and System Aspects; Proximity-based services (ProSe); Stage 2 (Release 12)," 3GPP TS 23.303, V12.2.0, pp. 1-61, 3$^{rd}$ Generation Partnership Project, Valbonne, France (Sep. 2014).

* cited by examiner

CONNECTION ESTABLISHMENT METHOD, DEVICE, AND SYSTEM

CROSS-REFERENCE TO RELATED APPLICATIONS

This application is a continuation of International Application No. PCT/CN2014/090585, filed on Nov. 7, 2014, the disclosure of which is hereby incorporated by reference in its entirety.

TECHNICAL FIELD

The embodiments of present invention relate to the communications field, and in particular, to a connection establishment method, a device, and a system.

BACKGROUND

In a wireless communications network, user equipment may be out of network coverage. For example, users are in places with a weak network signal or places not covered by a network signal, such as a basement, and the user equipment out of network coverage are referred to as remote user equipment. In this case, to enable the remote user equipment out of network coverage to maintain a communication connection to a network, in an implementation manner, as shown in FIG. 1, user equipment that is relatively close to the remote user equipment, that can exchange information with the remote user equipment, and that falls within the network coverage may be used as relay user equipment, and data is forwarded between a user and the network by using the relay user equipment.

Currently, a technical recommendation that user equipment is used as a relay device is already used in communication of emergency services such as a public safety service, to resolve problems of communication of some users out of network coverage.

In the prior art, in a process of establishing a connection between remote user equipment and relay user equipment, after the relay user equipment enables a relay service function, when sending a registration request to an application server for registration, the relay user equipment receives group member information returned by the application server. The relay user equipment may establish, according to the group member information, a connection to user equipment needing a relay service, to provide a relay service for the user equipment.

During implementation of the foregoing process, timing when the relay user equipment receives the group member information is after the relay service function is enabled. If the relay service function is enabled after registration of the relay user equipment is already completed, the relay user equipment cannot provide a relay service. In addition, the relay user equipment can establish a connection to any user equipment. Consequently, security of a relay service function is relatively poor.

SUMMARY

Embodiments of the present invention provide a connection establishment method, a device, and a system, to resolve a problem that because relay user equipment can establish a connection to any user equipment, security of a relay service function is relatively poor.

To achieve the foregoing objective, the following technical solutions are used in the embodiments of the present invention:

According to a first aspect, an embodiment of the present invention provides a connection establishment method, including:

receiving, by first user equipment, a served object group identifier from a network device, where the served object group identifier is used to indicate a group of served objects for which the first user equipment provides a relay service;

receiving, by the first user equipment, discovery information from second user equipment, where the discovery information includes an identifier of a second group and a relay service request, the relay service request is used to request a relay service, and the identifier of the second group is used to indicate a group to which the second user equipment belongs or a group to which a user of the second user equipment belongs; and when the identifier of the second group is included in the served object group identifier, obtaining, by the first user equipment, a data link layer identity ID of the second user equipment, and establishing a connection between the first user equipment and the second user equipment according to the data link layer ID of the second user equipment.

With reference to the first aspect, in a first possible implementation manner of the first aspect, before the receiving, by first user equipment, a served object group identifier from a network device, the method further includes:

sending, by the first user equipment, a service authorization request to the network device; and the receiving, by first user equipment, a served object group identifier from a network device includes:

receiving, by the first user equipment, a service authorization response from the network device, where the service authorization response carries the served object group identifier.

With reference to the first aspect, in a second possible implementation manner of the first aspect, before the receiving, by first user equipment, a served object group identifier from a network device, the method further includes:

receiving, by the first user equipment, a served object group name from the network device, where the served object group name corresponds to the served object group identifier; and sending, by the first user equipment, discovery request information to the network device, where the discovery request information includes the served object group name; and the receiving, by first user equipment, a served object group identifier from a network device includes:

receiving, by the first user equipment, discovery acknowledgement information from the network device, where the discovery acknowledgement information includes the served object group identifier.

With reference to the first aspect, in a third possible implementation manner of the first aspect, the discovery information further includes the data link layer ID of the second user equipment; and the obtaining, by the first user equipment, a data link layer identity ID of the second user equipment includes:

obtaining, by the first user equipment, the data link layer ID of the second user equipment from the discovery information.

With reference to the first aspect, in a fourth possible implementation manner of the first aspect, the discovery information further includes a name of the second user equipment, where the name of the second user equipment is used to identify the second user equipment;

before the obtaining, by the first user equipment, a data link layer identity ID of the second user equipment, the method further includes:

sending, by the first user equipment, first authentication information to the network device, where the first authentication information carries the name of the second user equipment; and the obtaining, by the first user equipment, a data link layer identity ID of the second user equipment includes:

receiving, by the first user equipment, first authentication acknowledgement information from the network device, where the first authentication acknowledgement information carries the data link layer ID of the second user equipment.

According to a second aspect, an embodiment of the present invention provides a connection establishment method, including:

receiving, by a network device, first authentication information from first user equipment, where the first authentication information includes an identifier of a second group, and the identifier of the second group is used to indicate a group to which second user equipment belongs or a group to which a user of second user equipment belongs;

obtaining, by the network device, a served object group identifier of the first user equipment, where the served object group identifier of the first user equipment is used to indicate a group of served objects for which the first user equipment provides a relay service; and when the identifier of the second group is included in the served object group identifier of the first user equipment, sending, by the network device, first authentication acknowledgement information to the first user equipment, where the first authentication acknowledgement information is used to instruct the first user equipment to provide a relay service for the second user equipment.

With reference to the second aspect, in a first possible implementation manner of the second aspect, the method further includes:

sending, by the network device, a data link layer identity ID of the second user equipment to the first user equipment, where the data link layer ID of the second user equipment is used to establish a connection between the first user equipment and the second user equipment.

According to a third aspect, an embodiment of the present invention provides first user equipment, including:

a receiving unit, configured to receive a served object group identifier from a network device, where the served object group identifier is used to indicate a group of served objects for which the first user equipment provides a relay service, where the receiving unit is further configured to receive discovery information from second user equipment, where the discovery information includes an identifier of a second group and a relay service request, the relay service request is used to request a relay service, and the identifier of the second group is used to indicate a group to which the second user equipment belongs or a group to which a user of the second user equipment belongs; and a connection unit, configured to: when the identifier of the second group received by the receiving unit is included in the served object group identifier, obtain a data link layer identity ID of the second user equipment, and establish a connection between the first user equipment and the second user equipment according to the data link layer ID of the second user equipment.

With reference to the third aspect, in a first possible implementation manner of the third aspect, the first user equipment further includes a sending unit, configured to send a service authorization request to the network device; and the receiving unit is further configured to receive a service authorization response from the network device, where the service authorization response carries the served object group identifier.

With reference to the third aspect, in a second possible implementation manner of the third aspect, the receiving unit is further configured to receive a served object group name from the network device, where the served object group name corresponds to the served object group identifier;

the first user equipment further includes a sending unit, configured to send discovery request information to the network device, where the discovery request information includes the served object group name; and the receiving unit is further configured to receive discovery acknowledgement information from the network device, where the discovery acknowledgement information includes the served object group identifier.

With reference to the third aspect, in a third possible implementation manner of the third aspect, the discovery information further includes the data link layer ID of the second user equipment; and the connection unit is specifically configured to obtain the data link layer ID of the second user equipment from the discovery information.

With reference to the third aspect, in a fourth possible implementation manner of the third aspect, the discovery information further includes a name of the second user equipment, where the name of the second user equipment is used to identify the second user equipment;

the first user equipment further includes a sending unit, configured to send first authentication information to the network device, where the first authentication information carries the name of the second user equipment; and the receiving unit is further configured to receive first authentication acknowledgement information from the network device, where the first authentication acknowledgement information carries the data link layer ID of the second user equipment.

According to a fourth aspect, an embodiment of the present invention provides a network device, including:

a receiving unit, configured to receive first authentication information from first user equipment, where the first authentication information includes an identifier of a second group, and the identifier of the second group is used to indicate a group to which second user equipment belongs or a group to which a user of second user equipment belongs;

an obtaining unit, configured to obtain a served object group identifier of the first user equipment, where the served object group identifier of the first user equipment is used to indicate a group of served objects for which the first user equipment provides a relay service; and a sending unit, configured to: when the identifier of the second group received by the receiving unit is included in the served object group identifier obtained by the obtaining unit, send first authentication acknowledgement information to the first user equipment, where the first authentication acknowledgement information is used to instruct the first user equipment to provide a relay service for the second user equipment.

With reference to the fourth aspect, in a first possible implementation manner of the fourth aspect, the sending unit is further configured to send a data link layer identity ID of the second user equipment to the first user equipment, where the data link layer ID of the second user equipment is used to establish a connection between the first user equipment and the second user equipment.

According to a fifth aspect, an embodiment of the present invention provides first user equipment, including a processor, a memory, a bus, and a receiver, where the processor, the memory, and the receiver are connected to each other by using the bus;

the receiver is configured to receive a served object group identifier from a network device, where the served object group identifier is used to indicate a group of served objects for which the first user equipment provides a relay service;

the receiver is further configured to receive discovery information from second user equipment, where the discovery information includes an identifier of a second group and a relay service request, the relay service request is used to request a relay service, and the identifier of the second group is used to indicate a group to which the second user equipment belongs or a group to which a user of the second user equipment belongs; and the processor is configured to: when the identifier of the second group received by the receiver is included in the served object group identifier, obtain a data link layer identity ID of the second user equipment, and establish a connection between the first user equipment and the second user equipment according to the data link layer ID of the second user equipment.

With reference to the fifth aspect, in a first possible implementation manner of the fifth aspect, the first user equipment further includes a transmitter, configured to send a service authorization request to the network device; and the receiver is further configured to receive a service authorization response from the network device, where the service authorization response carries the served object group identifier.

With reference to the fifth aspect, in a second possible implementation manner of the fifth aspect, the receiver is further configured to receive a served object group name from the network device, where the served object group name corresponds to the served object group identifier;

the first user equipment further includes a transmitter, configured to send discovery request information to the network device, where the discovery request information includes the served object group name; and the receiver is further configured to receive discovery acknowledgement information from the network device, where the discovery acknowledgement information includes the served object group identifier.

With reference to the fifth aspect, in a third possible implementation manner of the fifth aspect, the discovery information further includes the data link layer ID of the second user equipment; and the processor is specifically configured to obtain the data link layer ID of the second user equipment from the discovery information.

With reference to the fifth aspect, in a fourth possible implementation manner of the fifth aspect, the discovery information further includes a name of the second user equipment, where the name of the second user equipment is used to identify the second user equipment;

the first user equipment further includes a transmitter, configured to send first authentication information to the network device, where the first authentication information carries the name of the second user equipment; and the receiver is further configured to receive first authentication acknowledgement information from the network device, where the first authentication acknowledgement information carries the data link layer ID of the second user equipment.

According to a sixth aspect, an embodiment of the present invention provides a network device, including a processor, a memory, a bus, a receiver, and a transmitter, where the processor, the memory, the receiver, and the transmitter are connected to each other by using the bus;

the receiver is configured to receive first authentication information from first user equipment, where the first authentication information includes an identifier of a second group, and the identifier of the second group is used to indicate a group to which second user equipment belongs or a group to which a user of second user equipment belongs;

the processor is configured to obtain a served object group identifier of the first user equipment, where the served object group identifier of the first user equipment is used to indicate a group of served objects for which the first user equipment provides a relay service; and the transmitter is configured to: when the identifier of the second group received by the receiver is included in the served object group identifier obtained by the processor, send first authentication acknowledgement information to the first user equipment, where the first authentication acknowledgement information is used to instruct the first user equipment to provide a relay service for the second user equipment.

With reference to the sixth aspect, in a first possible implementation manner of the sixth aspect, the transmitter is further configured to send a data link layer identity ID of the second user equipment to the first user equipment, where the data link layer ID of the second user equipment is used to establish a connection between the first user equipment and the second user equipment.

According to the connection establishment method, the device, and the system that are provided in the embodiments of the present invention, first user equipment receives a served object group identifier sent by a network device, receives discovery information sent by second user equipment, and when determining that an identifier of a second group is included in the served object group identifier, establishes a connection between the first user equipment and the second user equipment according to a data link layer ID of the second user equipment and provides a relay service for the second user equipment. In this way, the first user equipment can provide a relay service for only a particular group of served objects, thereby improving security of a relay service function.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the embodiments of the present invention.

Figure 1:
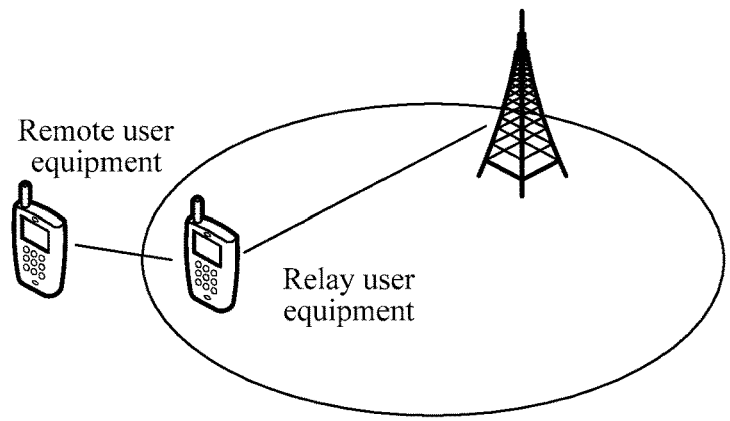
FIG. 1 is a schematic diagram of a relay communication manner in the prior art.
Figure 2:
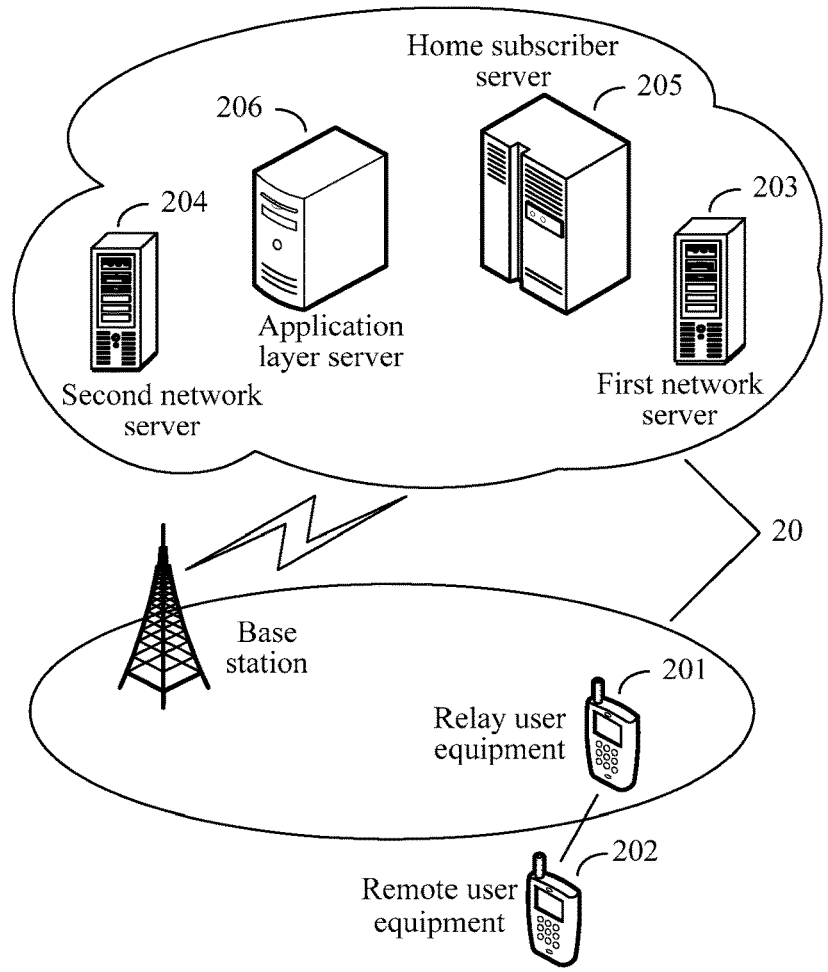
FIG. 2 is a schematic structural diagram of a wireless network system according to an embodiment of the present invention.

FIG. 2 shows a wireless network system. The wireless network system 20 shown in FIG. 2 includes relay user equipment 201, remote user equipment 202, and a first network server 203. Optionally, the wireless network system may further include a second network server 204, an HSS (home subscriber server) 205, and an application layer server 206. Limitedly, the wireless network system may be an LTE (Long Term Evolution) system.

The relay user equipment 201 is configured to provide a relay service for other user equipment. Preferably, the relay service in the embodiment of the present invention includes: forwarding information between other user equipment and a network side to implement communication between the other user equipment and the network side.

The remote user equipment 202 is user equipment out of coverage of the wireless network system and is user equipment that needs a relay service provided by other user equipment.

The first network server 203 and the second network server 204 may be network side functional entities required to process direct communication between terminal devices.

The HSS 205 is an important part of a control layer of an IMS (IP Multimedia Subsystem). The HSS supports a main user database of an IMS network entity used to process calls/sessions. The HSS includes a user configuration file, performs user authentication and authorization, and provides physical location information of the user.

Figure 3:
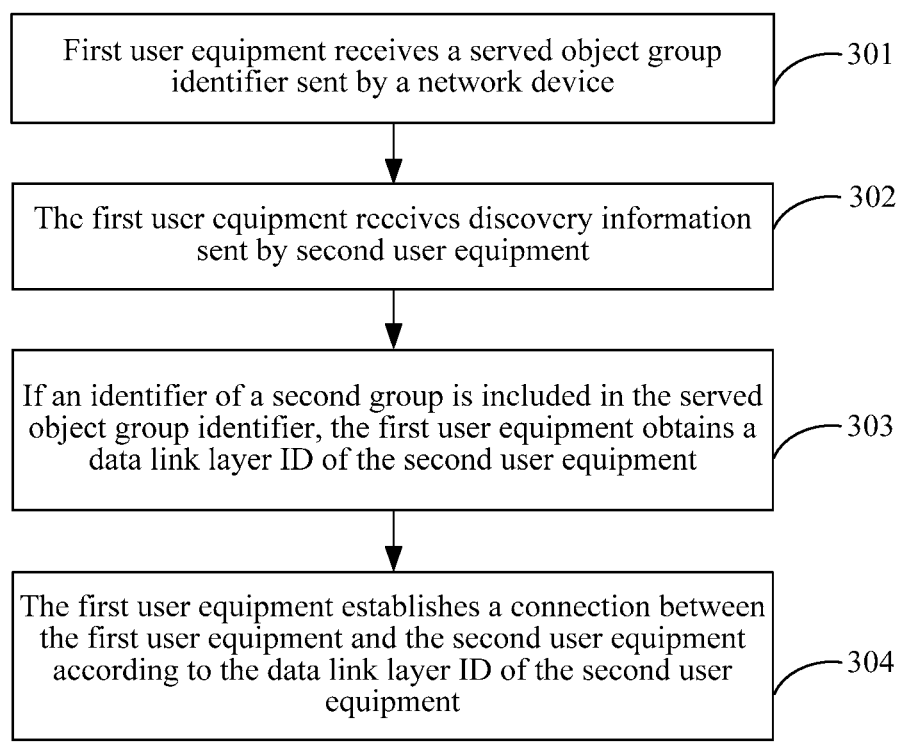
FIG. 3 is a schematic flowchart of a connection establishment method according to an embodiment of the present invention.

An embodiment of the present invention provides a connection establishment method, which is applied to first user equipment. Preferably, the connection establishment method provided in this embodiment may be applied to the wireless network system described in the embodiment corresponding to FIG. 2. Optionally, the first user equipment may be the relay user equipment in the wireless network system shown in FIG. 2. Referring to FIG. 3, the connection establishment method in this embodiment includes the following steps:

301: The first user equipment receives a served object group identifier sent by a network device.

The served object group identifier is used to indicate a group of served objects for which the first user equipment provides a relay service, and the served object group identifier includes at least one group identifier. Optionally, the network device may first obtain a served object group name, and the served object group identifier is obtained according to the served object group name from the network device. Further optionally, the group of served objects for which the first user equipment provides a relay service may be preconfigured by a network side. Further optionally, in an OSI (open systems interconnection) model, the served object group identifier may be a data link layer ID (identity) of the group of served objects, and the served object group name may be an application layer ID of the group of served objects.

Preferably, the method is applied to the wireless network system described in the embodiment corresponding to FIG. 2, and the network device may be the first network server. The served object of the first user equipment may be preconfigured by an application layer management device. In this way, objects for which the first user equipment provides a relay service are some user equipment belonging to a particular group, and not every user equipment can establish a connection to the first user equipment, which is equivalent that objects for which the first user equipment provides a relay service are filtered, thereby improving information exchange security in a relay service process.

302: The first user equipment receives discovery information sent by second user equipment.

The discovery information includes an identifier of a second group and a relay service request. The relay service request is used to indicate that the second user equipment needs a relay service. The identifier of the second group is used to indicate a group to which the second user equipment belongs or a group to which a user of the second user equipment belongs.

The second user equipment may provide a service for at least one user, and the user of the second user equipment may be one or more of the at least one user, which are not limited herein.

Preferably, the method is applied to the wireless network system described in the embodiment corresponding to FIG. 2, and the second user equipment may be the remote user equipment in the wireless network system shown in FIG. 2. Optionally, when the second user equipment needs a relay service provided by other user equipment, the second user equipment may send the discovery information in a broadcast mode, and then the first user equipment can receive the discovery information. Certainly, if there is other relay user equipment in the wireless network system, the other relay user equipment can also receive the discovery information. In this embodiment, the first user equipment is merely used as an example for description.

Optionally, there is no particular sequence for step 301 and step 302. After step 301 and step 302, the method further includes:

303: If an identifier of a second group is included in the served object group identifier, the first user equipment obtains a data link layer ID (identity) of the second user equipment.

Optionally, the discovery information may include the data link layer ID of the second user equipment, and the first user equipment may directly obtain the data link layer ID of the second user equipment from the discovery information.

Alternatively, optionally, the discovery information includes a name of the second user equipment, where the name of the second user equipment is used to identify the second user equipment. Preferably, the name of the second user equipment may be a discovery code of the second user equipment. The first user equipment obtains the data link layer ID of the second user equipment from the network device according to the name of the second user equipment. Further preferably, the first user equipment sends first authentication information to the network device. The first authentication information carries the name of the second user equipment. The first user equipment receives first authentication acknowledgement information sent by the first network device. The first authentication acknowledgement information includes the data link layer ID of the second user equipment. Further optionally, the name of the second user equipment may be the discovery code (Group ProSe Code) of the second user equipment.

Certainly, the first user equipment may obtain the data link layer ID of the second user equipment in another manner.

304: The first user equipment establishes a connection between the first user equipment and the second user equipment according to the data link layer ID of the second user equipment.

After establishing the connection between the first user equipment and the second user equipment, the first user equipment can provide a relay service for the second user equipment. Optionally, after receiving the discovery information, the first user equipment determines whether the identifier of the second group is included in the served object group identifier. If the identifier of the second group is not included in the served object group identifier, it indicates that the second user equipment is not an object for which the first user equipment may provide a relay service. If the identifier of the second group is included in the served object group identifier, it indicates that the second user equipment is an object for which the first user equipment provides a relay service, requiring only that the first user equipment establishes a connection to the second user equipment according to the data link layer ID of the second user equipment.

Preferably, the first user equipment establishes a D2D (device to device) connection to the second user equipment.

According to the connection establishment method provided in this embodiment of the present invention, first user equipment receives a served object group identifier sent by a network device, receives discovery information sent by second user equipment, and when determining that an identifier of a second group is included in the served object group identifier, establishes a connection between the first user equipment and the second user equipment according to a data link layer ID of the second user equipment and provides a relay service for the second user equipment. In this way, the first user equipment can provide a relay service for only a particular group of served objects, thereby improving security of a relay service function.

Figure 4:
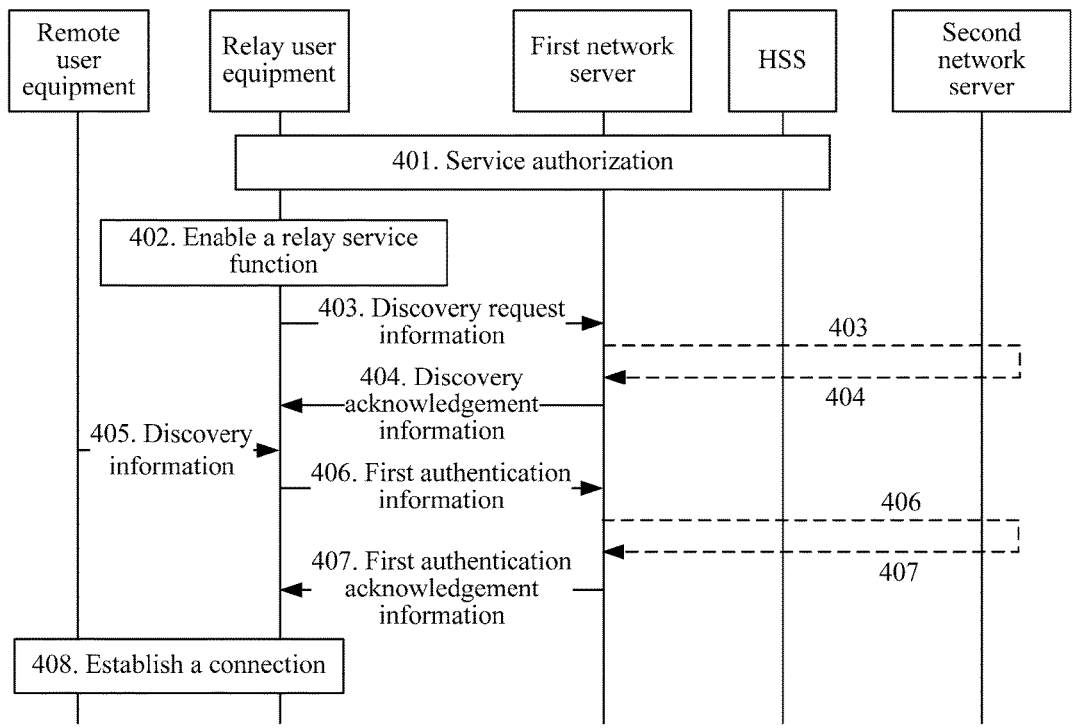
FIG. 4 is a schematic diagram of information exchange in a connection establishment method according to another embodiment of the present invention.

Based on the embodiment corresponding to FIG. 3, another embodiment of the present invention provides a connection establishment method. Preferably, the method is applied to the wireless network system described in the embodiment corresponding to FIG. 2. Corresponding to the wireless network system shown in FIG. 2, in this embodiment, first user equipment may be the relay user equipment, second user equipment may be the remote user equipment, and a network device may be the first network server. Certainly, in this embodiment, the wireless network system shown in FIG. 2 is merely used as an example for description and the embodiments of the present invention is not limited thereto. Referring to FIG. 4, the connection establishment method provided in this embodiment includes:

401: Perform service authorization for first user equipment.

Specifically optionally, the first user equipment sends a service authorization request to the network device, where the service authorization request includes indication information that the first user equipment requests to provide a relay service for other user equipment. The relay service includes: forwarding information of the other user equipment to implement communication between the other user equipment and a network side. The other user equipment includes the second user equipment. The first user equipment receives service authorization response information sent by the network device.

Preferably, the service authorization response information carries a served object group name of the first user equipment. The served object group name includes at least one group name. Further optionally, the served object group name may be an application layer ID of the group of served objects. The served object group name may be a group list (Group List). The served object group name may be added to another message and is sent to the first user equipment, or the network device adds the served object group name to a single message and sends the single message to the first user equipment, which is not limited in this embodiment of the present invention.

Optionally, the network device may obtain authorization to the first user equipment by sending a request to an HSS.

402: The first user equipment enables a relay service function according to service authorization response information.

403: The first user equipment sends discovery request information to a network device.

Specifically optionally, the discovery request information includes the served object group name. Optionally, the discovery request information is used to request obtaining group member monitoring (Monitor Group Member) permission.

404: The first user equipment receives discovery acknowledgement information sent by the network device.

Specifically optionally, the discovery acknowledgement information includes a served object group identifier. The served object group identifier includes at least one group identifier. With reference to the served object group name in step 403, one group identifier corresponds to one group name. Preferably, the served object group identifier may be a data link layer ID of the group of served objects, or the served object group identifier may be a discovery code of the group of served objects.

In a specific implementation manner, optionally, the served object group identifier may be added to the service authorization response information in step 401 and is sent to the first user equipment. In this case, step 403 and step 404 may be skipped, and step 405 is directly performed. Certainly, the served object group identifier may be added to other information and is sent to the first user equipment, or the network device adds the served object group identifier to a single piece of information and sends the information to the first user equipment, which is not limited in this embodiment of the present invention.

In another specific implementation manner, optionally, step 401 and step 402 may be not performed, and step 403 is directly performed. When receiving the discovery request information sent by the first user equipment, the network device adds the served object group identifier to the discovery acknowledgement information and sends the discovery acknowledgement information to the first user equipment. Further optionally, the network device may send information to the HSS or an application layer server, to obtain the served object group identifier. Preferably, the application layer server may be an MCPTT (Mission Critical push to talk over LTE, mission critical push to talk over LTE) server. Further optionally, if the served object group name is obtained from the MCPTT server, the network device further needs to obtain the corresponding served object group identifier.

Further optionally, if some groups of the served object group names and the network device do not belong to a same network, the network device needs to send a message to a network server to which these groups belong, to obtain data link layer IDs of these groups.

Optionally, the discovery acknowledgement information is used to indicate that the first user equipment obtains the group member monitoring permission and the first user equipment may start monitoring. In some application scenarios, the network device may send a message to the HSS or the application layer server, so that the first user equipment obtains group member monitoring permission.

405: The first user equipment receives discovery information sent by second user equipment.

The discovery information includes an identifier of a second group and a relay service request. The relay service request is used to indicate that the second user equipment needs a relay service. The identifier of the second group is used to indicate a group to which the second user equipment belongs or a group to which a user of the second user equipment belongs. The second user equipment may provide a service for at least one user. Optionally, the discovery information may further include a name of the second user equipment or a data link layer ID of the second user equipment, where the name of the second user equipment is used to identify the second user equipment.

Preferably, the second user equipment sends the discovery information in a broadcast mode, and the first user equipment receives the discovery information of the second user equipment by means of group member monitoring.

Preferably, the first user equipment may determine, according to whether the served object group identifier includes the identifier of the second group, whether the second user equipment belongs to the served object group of the first user equipment. If the served object group identifier includes the identifier of the second group, it indicates that the first user equipment can provide a relay service for the second user equipment.

Optionally, there is no particular sequence for step 405 and any one of step 401 to step 404. Further, step 406 may be performed.

Alternatively, the first user equipment may send broadcast information, where the broadcast information includes a data link layer ID of the first user equipment, a relay service request, and an identifier of a served object group authorized by the network. After receiving the broadcast information from the first user equipment, the second user equipment determines, according to the served object group identifier broadcast by the first user equipment, whether the first user equipment can provide a relay service for the second user equipment. If the first user equipment can provide a relay service for the second user equipment, the second user equipment sends a connection request to the first user equipment, and step 408 is directly performed.

406: The first user equipment sends first authentication information to the network device.

Preferably, with reference to step 405, the first authentication information may include the name of the second user equipment or the data link layer ID of the second user equipment. The network device authenticates, according to the name of the second user equipment or the data link layer ID of the second user equipment, whether an identity of the second user equipment is valid. If the second user equipment and the network device do not belong to a same network, the network device needs to send a message to another network server. Specifically, the network device may send a message to a second network server, to authenticate the identity of the second user equipment, where the second network server and the second user equipment belong to a same network.

Preferably, the name of the second user equipment may be a discovery code of the second user equipment.

407: The first user equipment receives first authentication acknowledgement information sent by the network device.

Preferably, the first authentication acknowledgement information may further include the data link layer ID of the second user equipment. If the second user equipment and the network device do not belong to a same network, but the second user equipment and the second network server belong to a same network, the network device obtains the data link layer ID of the second user equipment by sending a message to the second network server. Optionally, with reference to step 405, if the discovery information carries the data link layer ID of the second user equipment, in step 407, the first authentication acknowledgement information may not carry the data link layer ID of the second user equipment.

Certainly, the first user equipment may obtain the data link layer ID of the second user equipment in another manner.

It should be noted that, step 406 and step 407 provide a method for authenticating, by a network side, whether the second user equipment is valid. The method is merely a preferred solution. In addition, the first user equipment may authenticate the identity of the second user equipment in another manner.

408: The first user equipment establishes a connection between the first user equipment and the second user equipment according to a data link layer ID of the second user equipment.

After establishing the connection between the first user equipment and the second user equipment, the first user equipment can provide a relay service for the second user equipment. Specifically optionally, the first user equipment establishes a connection to the second user equipment according to the data link layer ID of the second user equipment. Preferably, the first user equipment establishes a D2D connection to the second user equipment.

Preferably, the first user equipment sends the data link layer ID of the first user equipment and the identifier of the second group to the second user equipment in a broadcast mode, or the first user equipment may directly send a point-to-point message that carries the data link layer ID of the first user equipment and the identifier of the second group to the second user equipment.

After receiving the data link layer ID of the first user equipment and the identifier of the second group that are sent by the first user equipment, the second user equipment establishes a connection to the first user equipment. The second user equipment may send information to the network device to authenticate whether the first user equipment is valid, and then establish a connection to the first user equipment. It should be noted that, this method for authenticating, by the network side, whether the first user equipment is valid is merely a preferred solution. In addition, the second user equipment may authenticate an identity of the first user equipment in another manner.

Further optionally, the second user equipment may receive broadcast messages sent by multiple relay user equipment. In this case, the second user equipment may select one relay user equipment, and establish a connection to the relay user equipment.

According to the connection establishment method provided in this embodiment of the present invention, first user equipment receives a served object group identifier sent by a network device, receives discovery information sent by second user equipment, and when determining that an identifier of a second group is included in the served object group identifier, establishes a connection between the first user equipment and the second user equipment according to a data link layer ID of the second user equipment and provides a relay service for the second user equipment. In this way, the first user equipment can provide a relay service for only a particular group of served objects, thereby improving security of a relay service function.

Figure 5:
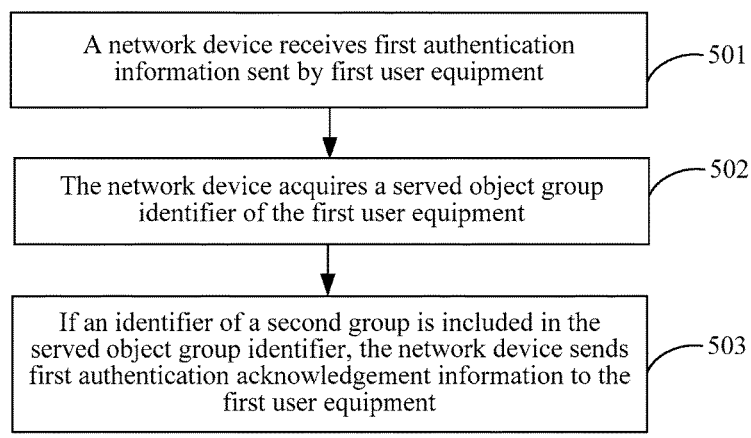
FIG. 5 is a schematic flowchart of another connection establishment method according to an embodiment of the present invention.

With reference to the embodiment corresponding to FIG. 3, an embodiment of the present invention provides another connection establishment method, which is applied to a network device. Preferably, the connection establishment method provided in this embodiment may be applied to the wireless network system described in the embodiment corresponding to FIG. 2. Further optionally, the network device may be the first network server in the network system shown in FIG. 2. Referring to FIG. 5, the connection establishment method provided in this embodiment includes the following steps:

501: The network device receives first authentication information sent by first user equipment.

The first authentication information includes an identifier of a second group, and the identifier of the second group is used to indicate a group to which second user equipment belongs or a group to which a user of second user equipment belongs, where the second user equipment can provide a service for at least one user. Preferably, the method is applied to the wireless network system shown in FIG. 2, the first user equipment may be the relay user equipment, and the second user equipment may be the remote user equipment. With reference to the embodiment corresponding to FIG. 3, after receiving discovery information of the second user equipment, the first user equipment sends the first authentication information to the network device. A difference from the embodiment corresponding to FIG. 3 lies in that the network device does not need to send an identifier of a served object to the first user equipment.

502: The network device obtains a served object group identifier of the first user equipment.

The network device obtains a pre-stored served object group identifier. The served object group identifier is an identifier of a group for which the first user equipment provides a relay service. The served object group identifier includes at least one group identifier. Preferably, the served object group identifier may be a data link layer ID of a group of served objects.

503: If an identifier of a second group is included in the served object group identifier, the network device sends first authentication acknowledgement information to the first user equipment.

The first authentication acknowledgement information is used to instruct the first user equipment to provide a relay service for the second user equipment. In this embodiment, the network device determines, by determining that the identifier of the second group is included in the served object group identifier, that the first user equipment can provide a relay service for the second user equipment.

According to the connection establishment method provided in this embodiment of the present invention, a network device receives first authentication information sent by first user equipment, obtains a served object group identifier, and when determining that an identifier of a second group is included in the served object group identifier, sends first authentication acknowledgement information to the first user equipment. In this way, the first user equipment can provide a relay service for only a particular group of served objects, thereby improving security of a relay service function.

Figure 6:
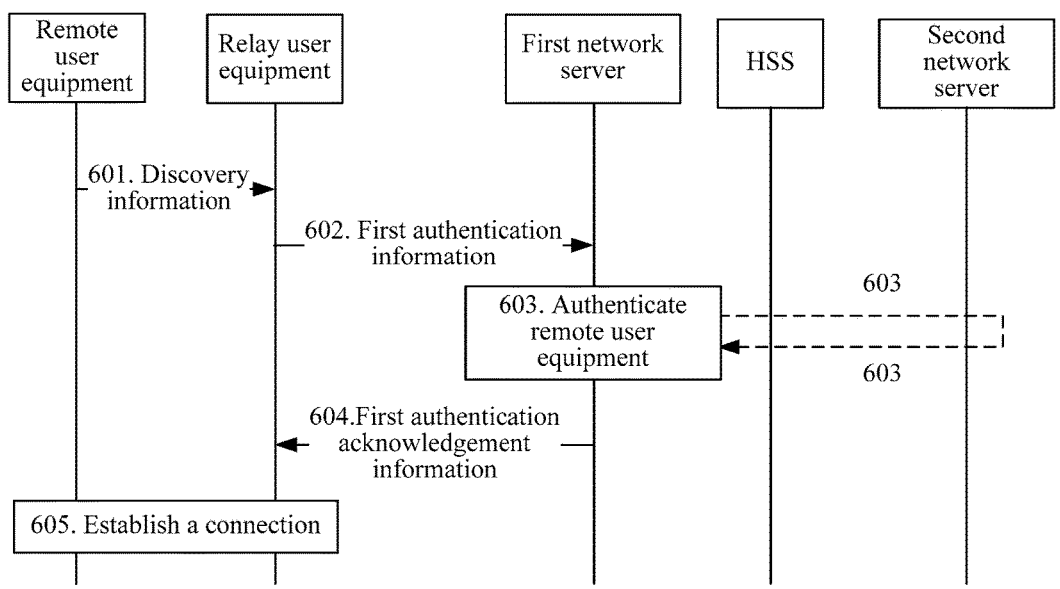
FIG. 6 is a schematic diagram of information exchange of another connection establishment method according to another embodiment of the present invention.

Based on the embodiment corresponding to FIG. 5, another embodiment of the present invention provides another connection establishment method. A principle of the method is the same as that of the connection establishment method in the embodiment corresponding to FIG. 4. A difference between the methods lies in that, in this embodiment, a network device does not need to send a served object group name or a served object group identifier to first user equipment, and the network device determines whether the first user equipment can provide a relay service for second user equipment. Preferably, the method is applied to the wireless network system described in the embodiment corresponding to FIG. 2. Corresponding to the wireless network system shown in FIG. 2, in this embodiment, the first user equipment may be the relay user equipment, the second user equipment may be the remote user equipment, and the network device may be the first network server. Certainly, in this embodiment, the wireless network system shown in FIG. 2 is merely used as an example for description and the embodiments of the present invention is not limited thereto. Referring to FIG. 6, when the first user equipment enables a relay service function and obtains group member monitoring permission, the connection establishment method provided in this embodiment includes:

601: The first user equipment receives discovery information sent by the second user equipment.

The discovery information includes an identifier of a second group and a relay service request. The relay service request is used to indicate that the second user equipment needs a relay service. The identifier of the second group is used to indicate a group to which the second user equipment belongs or a group to which a user of the second user equipment belongs. The second user equipment may provide a service for at least one user, and the user of the second user equipment may be one or more of the at least one user, which are not limited herein. The discovery information may further include a name of the second user equipment or a data link layer ID of the second user equipment, where the name of the second user equipment is used to identify the second user equipment.

Preferably, the second user equipment sends the discovery information in a broadcast mode, and the first user equipment receives the discovery information of the second user equipment by means of group member monitoring. Alternatively, the first user equipment may send broadcast information, where the broadcast information includes a data link layer ID of the first user equipment and a relay service request, and after receiving the broadcast information of the first user equipment, the second user equipment sends the discovery information to the first user equipment.

602: The first user equipment sends first authentication information to the network device.

The first authentication information includes the identifier of the second group. Preferably, the identifier of the second group may be a data link layer ID of the group to which the second user equipment belongs, or may be a discovery code of the group to which the second user equipment belongs.

603: Determine whether the first user equipment can provide a relay service for the second user equipment.

Specifically, the network device obtains a pre-stored served object group identifier. The served object group identifier is an identifier of a group for which the first user equipment provides a relay service. The served object group identifier includes at least one group identifier. Preferably, the served object group identifier may be a data link layer ID of a group of served objects. Further optionally, in an application scenario, the network device may obtain the served object group identifier by sending information to an HSS or an MCPTT server.

The network device determines whether the served object group identifier includes an identifier of the group to which the second user equipment belongs, to determine whether the first user equipment can provide a relay service for the second user equipment. If the served object group identifier includes the identifier of the group to which the second user equipment belongs, it indicates that the second user equipment is an object for which the first user equipment provides a relay service.

Further preferably, the first authentication information may further include the name of the second user equipment or the data link layer ID of the second user equipment. The network device authenticates, according to the name of the second user equipment or the data link layer ID of the second user equipment, whether an identity of the second user equipment is valid. If the second user equipment and the network device do not belong to a same network, but the second user equipment and a second network server belong to a same network, the network device needs to send a message to the second network server, to authenticate the identity of the second user equipment.

Optionally, the name of the second user equipment may be a discovery code of the second user equipment.

Further, when it is determined that the identifier of the second group is included in the served object group identifier, step 604 is performed.

604: The first user equipment receives first authentication acknowledgement information sent by the network device.

Preferably, the first authentication acknowledgement information may further include the data link layer ID of the second user equipment. If the second user equipment and the network device do not belong to a same network, but the second user equipment and the second network server belong to a same network, the network device obtains the data link layer ID of the second user equipment by sending a message to the second network server. With reference to step 601, if the discovery information carries the data link layer ID of the second user equipment, in step 605, the first authentication acknowledgement information may not carry the data link layer ID of the second user equipment.

605: The first user equipment establishes a connection between the first user equipment and the second user equipment according to a data link layer ID of the second user equipment.

After establishing the connection between the first user equipment and the second user equipment, the first user equipment can provide a relay service for the second user equipment. Preferably, the first user equipment establishes a D2D connection to the second user equipment.

Preferably, the first user equipment sends the data link layer ID of the first user equipment and the identifier of the second group to the second user equipment in a broadcast mode, or the first user equipment may directly send the data link layer ID of the first user equipment and the identifier of the second group to the second user equipment. After receiving the data link layer ID of the first user equipment and the identifier of the second group that are sent by the first user equipment, the second user equipment may send information to the network device to authenticate whether the first user equipment is valid, and then establish a connection to the first user equipment.

Further optionally, the second user equipment may receive broadcast messages sent by multiple relay user equipment. In this case, the second user equipment may select one relay user equipment, and establish a connection to the relay user equipment.

According to the connection establishment method provided in this embodiment of the present invention, a network device receives first authentication information sent by first user equipment, obtains a served object group identifier, and when determining that an identifier of a second group is included in the served object group identifier, sends first authentication acknowledgement information to the first user equipment. In this way, the first user equipment can provide a relay service for only a particular group of served objects, thereby improving security of a relay service function.

Figure 7:
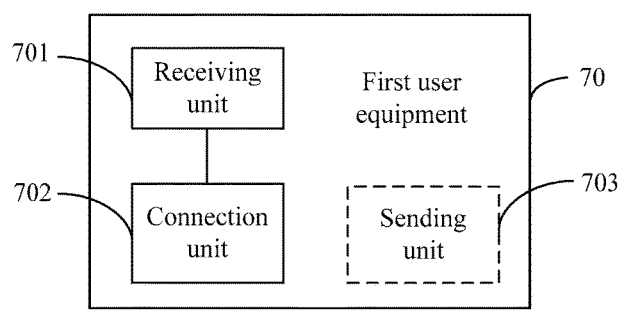
FIG. 7 is a schematic structural diagram of first user equipment according to an embodiment of the present invention.

Based on the embodiments corresponding to FIG. 3 and FIG. 4, an embodiment of the present invention provides first user equipment, configured to execute the connection establishment method described in the embodiment corresponding to FIG. 3 or FIG. 4. Preferably, the first user equipment may be applied to the wireless network system described in the embodiment corresponding to FIG. 2. In the network system shown in FIG. 2, the first user equipment may be the relay user equipment. Referring to FIG. 7, first user equipment 70 provided in this embodiment includes a receiving unit 701 and a connection unit 702.

The receiving unit 701 is configured to receive a served object group identifier sent by a network device, where the served object group identifier is used to indicate a group of served objects for which the first user equipment provides a relay service.

The receiving unit 701 is further configured to receive discovery information sent by second user equipment, where the discovery information includes an identifier of a second group and a relay service request, the relay service request is used to request a relay service, and the identifier of the second group is used to indicate a group to which the second user equipment belongs or a group to which a user of the second user equipment belongs.

The second user equipment may provide a service for at least one user, and the user of the second user equipment may be one or more of the at least one user, which are not limited herein.

The connection unit 702 is configured to: when the identifier of the second group received by the receiving unit 701 is included in the served object group identifier, obtain a data link layer identity ID of the second user equipment, and establish a connection between the first user equipment and the second user equipment according to the data link layer ID of the second user equipment.

Optionally, the first user equipment may further include a sending unit 703.

Optionally, in a first application scenario, the sending unit 703 is configured to send a service authorization request to the network device; and the receiving unit 701 is further configured to receive a service authorization response sent by the network device, where the service authorization response carries the served object group identifier.

Optionally, in a second application scenario, the receiving unit 701 is further configured to receive a served object group name sent by the network device, where the served object group name corresponds to the served object group identifier;

the sending unit 703 is configured to send discovery request information to the network device, where the discovery request information includes the served object group name; and the receiving unit 701 is further configured to receive discovery acknowledgement information sent by the network device, where the discovery acknowledgement information includes the served object group identifier.

Optionally, in a third application scenario, the discovery information further includes the data link layer ID of the second user equipment; and the connection unit 702 is specifically configured to obtain the data link layer ID of the second user equipment from the discovery information.

Optionally, in a fourth application scenario, the discovery information further includes a name of the second user equipment, where the name of the second user equipment is used to identify the second user equipment;

the first user equipment further includes a sending unit 703, configured to send first authentication information to the network device, where the first authentication information carries the name of the second user equipment; and the receiving unit 701 is further configured to receive first authentication acknowledgement information sent by the network device, where the first authentication acknowledgement information carries the data link layer ID of the second user equipment.

The first user equipment provided in this embodiment of the present invention receives a served object group identifier sent by a network device, receives discovery information sent by second user equipment, and when determining that an identifier of a second group is included in the served object group identifier, establishes a connection between the first user equipment and the second user equipment according to a data link layer ID of the second user equipment and provides a relay service for the second user equipment. In this way, the first user equipment can provide a relay service for only a particular group of served objects, thereby improving security of a relay service function.

Figure 8:
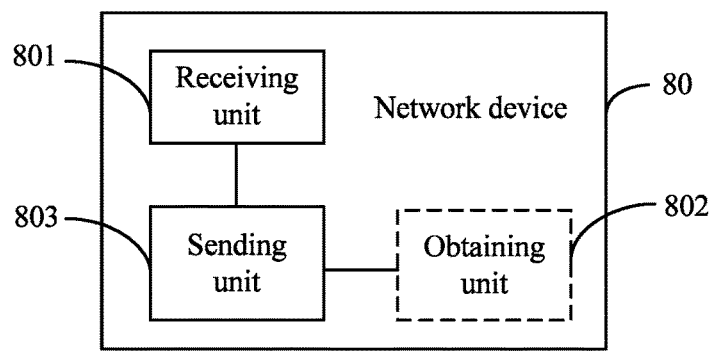
FIG. 8 is a schematic structural diagram of a network device according to an embodiment of the present invention.

Based on the embodiments corresponding to FIG. 5 and FIG. 6, an embodiment of the present invention provides a network device, configured to execute the connection establishment method described in the embodiment corresponding to FIG. 5 or FIG. 6. Preferably, the network device may be applied to the wireless network system described in the embodiment corresponding to FIG. 2. In the network system shown in FIG. 2, the network device may be the first network server. Referring to FIG. 8, a network device 80 provided in this embodiment includes a receiving unit 801, an obtaining unit 802, and a sending unit 803.

The receiving unit 801 is configured to receive first authentication information sent by first user equipment, where the first authentication information includes an identifier of a second group, and the identifier of the second group is used to indicate a group to which second user equipment belongs or a group to which a user of second user equipment belongs.

The second user equipment may provide a service for at least one user, and the user of the second user equipment may be one or more of the at least one user, which are not limited herein.

The obtaining unit 802 is configured to obtain a served object group identifier of the first user equipment, where the served object group identifier of the first user equipment is used to indicate a group of served objects for which the first user equipment provides a relay service.

The sending unit 803 is configured to: when the identifier of the second group received by the receiving unit 801 is included in the served object group identifier obtained by the obtaining unit 802, send first authentication acknowledgement information to the first user equipment, where the first authentication acknowledgement information is used to instruct the first user equipment to provide a relay service for the second user equipment.

Optionally, the sending unit 803 is further configured to send a data link layer identity ID of the second user equipment to the first user equipment, where the data link layer ID of the second user equipment is used to establish a connection between the first user equipment and the second user equipment.

The network device provided in this embodiment of the present invention receives first authentication information sent by first user equipment, obtains a served object group identifier, and when determining that an identifier of a second group is included in the served object group identifier, sends first authentication acknowledgement information to the first user equipment. In this way, the first user equipment can provide a relay service for only a particular group of served objects, thereby improving security of a relay service function.

Figure 9:
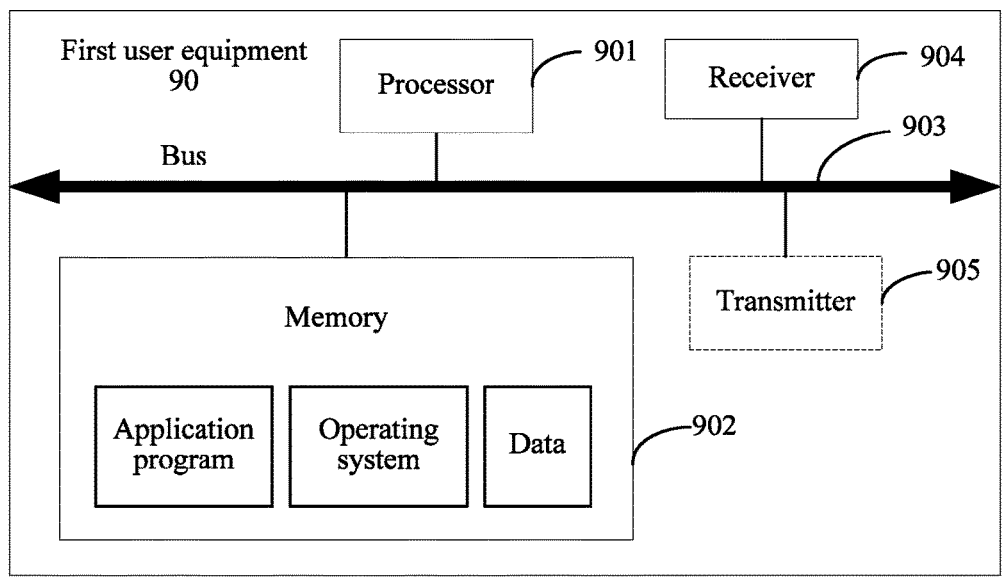
FIG. 9 is a schematic structural diagram of first user equipment according to another embodiment of the present invention.

Based on the embodiments corresponding to FIG. 3 and FIG. 4, another embodiment of the present invention provides first user equipment, configured to execute the connection establishment method described in the embodiment corresponding to FIG. 3 or FIG. 4. Preferably, the first user equipment may be applied to the wireless network system described in the embodiment corresponding to FIG. 2. In the network system shown in FIG. 2, the first user equipment may be the relay user equipment. Referring to FIG. 9, first user equipment 90 includes a processor 901, a memory 902, a bus 903, and a receiver 904, where the processor 901, the memory 902, and the receiver 904 are connected to and communicate with each other by using the bus 903.

The bus 903 may be an ISA (Industry Standard Architecture, Industry Standard Architecture) bus, a PCI (Peripheral Component, peripheral component interconnect) bus, an EISA (Extended Industry Standard Architecture, Extended Industry Standard Architecture) bus, or the like. The bus 903 may be classified into an address bus, a data bus, a control bus, and the like. For ease of representation, the bus in FIG. 9 is represented by using only one bold line, but it does not indicate that there is only one bus or only one type of bus.

The memory 902 is configured to store application program code for executing the solution of the embodiment of the present invention, where the application program code for executing the solution of the embodiment of the present invention is controlled and executed by the processor 901.

The memory may be a read-only memory ROM or another type of static storage device that can store static information and instructions, or a random access memory RAM or another type of dynamic storage device that can store information and instructions, or may be an electrically erasable programmable read-only memory EEPROM, a compact disc read-only memory CD-ROM or another optical disk memory or optical disc memory (including a compact disc, a laser disc, an optical disc, a digital versatile disc, a Blu-ray disc, and the like), a magnetic disk storage medium or another magnetic storage device, or any other medium that can carry or store expected program code in a form of instructions or data structures and that can be accessed by a computer, but the embodiments of the present invention are not limited thereto. These memories are connected to the processor by using the bus.

The processor 901 may be a central processing unit 901 (CPU for short), or an application specific integrated circuit (ASIC for short), or may be one or more integrated circuits configured to implement the embodiments of the present invention.

The processor 901 is configured to call the program code in the memory 902. In a possible implementation manner, when the foregoing application program is executed by the processor 901, the following functions are implemented.

The receiver 904 is configured to receive a served object group identifier sent by a network device, where the served object group identifier is used to indicate a group of served objects for which the first user equipment provides a relay service.

The receiver 904 is further configured to receive discovery information sent by second user equipment, where the discovery information includes an identifier of a second group and a relay service request, the relay service request is used to request a relay service, and the identifier of the second group is used to indicate a group to which the second user equipment belongs or a group to which a user of the second user equipment belongs.

The second user equipment may provide a service for at least one user, and the user of the second user equipment may be one or more of the at least one user, which are not limited herein.

The processor 901 is configured to: when the identifier of the second group received by the receiver 904 is included in the served object group identifier, obtain a data link layer identity ID of the second user equipment, and establish a connection between the first user equipment and the second user equipment according to the data link layer ID of the second user equipment.

Optionally, the first user equipment further includes a transmitter 905.

Optionally, in a first application scenario, the transmitter 905 is configured to send a service authorization request to the network device; and the receiver 904 is further configured to receive a service authorization response sent by the network device, where the service authorization response carries the served object group identifier.

Optionally, in a second application scenario, the receiver 904 is further configured to receive a served object group name sent by the network device, where the served object group name corresponds to the served object group identifier;

the transmitter 905 is configured to send discovery request information to the network device, where the discovery request information includes the served object group name; and the receiver 904 is further configured to receive discovery acknowledgement information sent by the network device, where the discovery acknowledgement information includes the served object group identifier.

Optionally, in a third application scenario, the discovery information further includes the data link layer ID of the second user equipment; and the processor 901 is specifically configured to obtain the data link layer ID of the second user equipment from the discovery information.

Optionally, in a fourth application scenario, the discovery information further includes a name of the second user equipment, where the name of the second user equipment is used to identify the second user equipment;

the transmitter 905 is configured to send first authentication information to the network device, where the first authentication information carries the name of the second user equipment; and the receiver 904 is further configured to receive first authentication acknowledgement information sent by the network device, where the first authentication acknowledgement information carries the data link layer ID of the second user equipment.

The first user equipment provided in this embodiment of the present invention receives a served object group identifier sent by a network device, receives discovery information sent by second user equipment, and when determining that an identifier of a second group is included in the served object group identifier, establishes a connection between the first user equipment and the second user equipment according to a data link layer ID of the second user equipment and provides a relay service for the second user equipment. In this way, the first user equipment can provide a relay service for only a particular group of served objects, thereby improving security of a relay service function.

Figure 10:
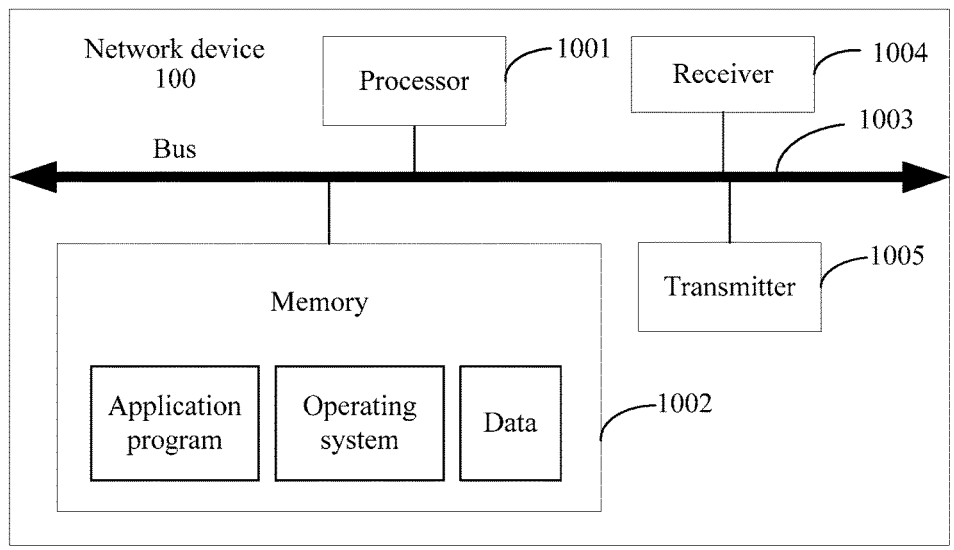
FIG. 10 is a schematic structural diagram of a network device according to another embodiment of the present invention.

Based on the embodiments corresponding to FIG. 5 and FIG. 6, another embodiment of the present invention provides a network device, configured to execute the connection establishment method described in the embodiment corresponding to FIG. 5 or FIG. 6. Preferably, the network device may be applied to the wireless network system described in the embodiment corresponding to FIG. 2. In the network system shown in FIG. 2, the network device may be the first network server. Referring to FIG. 10, a network device 100 includes a processor 1001, a memory 1002, a bus 1003, a receiver 1004, and a transmitter 1005, where the processor 1001, the memory 1002, the receiver 1004, and the transmitter 1005 are connected to and communicate with each other by using the bus 1003.

The bus 1003 may be an ISA (Industry Standard Architecture) bus, a PCI (peripheral component interconnect) bus, an EISA (Extended Industry Standard Architecture) bus, or the like. The bus 1003 may be classified into an address bus, a data bus, a control bus, and the like. For ease of representation, the bus in FIG. 10 is represented by using only one bold line, but it does not indicate that there is only one bus or only one type of bus.

The memory 1002 is configured to store application program code for executing the solution of the embodiment of the present invention, where the application program code for executing the solution of the embodiment of the present invention is stored in the memory, and is controlled and executed by the processor 1001.

The memory may be a read-only memory ROM or another type of static storage device that can store static information and instructions, or a random access memory RAM or another type of dynamic storage device that can store information and instructions, or may be an electrically erasable programmable read-only memory EEPROM, a compact disc read-only memory CD-ROM or another optical disk memory or optical disc memory (including a compact disc, a laser disc, an optical disc, a digital versatile disc, a Blu-ray disc, and the like), a magnetic disk storage medium or another magnetic storage device, or any other medium that can carry or store expected program code in a form of instructions or data structures and that can be accessed by a computer, but the embodiments of the present invention are not limited thereto. These memories are connected to the processor by using the bus.

The processor 1001 may be a central processing unit 1001 (CPU for short), or an application specific integrated circuit (ASIC for short), or may be one or more integrated circuits configured to implement the embodiments of the present invention.

The processor 1001 is configured to call the program code in the memory 1002. In a possible implementation manner, when the foregoing application program is executed by the processor 1001, the following functions are implemented.

The receiver 1004 is configured to receive first authentication information sent by first user equipment, where the first authentication information includes an identifier of a second group, and the identifier of the second group is used to indicate a group to which second user equipment belongs or a group to which a user of second user equipment belongs.

The second user equipment may provide a service for at least one user, and the user of the second user equipment may be one or more of the at least one user, which are not limited herein.

The processor 1001 is configured to obtain a served object group identifier of the first user equipment, where the served object group identifier of the first user equipment is used to indicate a group of served objects for which the first user equipment provides a relay service.

The transmitter 1005 is configured to: when the identifier of the second group received by the receiver 1004 is included in the served object group identifier obtained by the processor 1001, send first authentication acknowledgement information to the first user equipment, where the first authentication acknowledgement information is used to instruct the first user equipment to provide a relay service for the second user equipment.

Optionally, the transmitter 1005 is further configured to send a data link layer identity ID of the second user equipment to the first user equipment, where the data link layer ID of the second user equipment is used to establish a connection between the first user equipment and the second user equipment.

The network device provided in this embodiment of the present invention receives first authentication information sent by first user equipment, obtains a served object group identifier, and when determining that an identifier of a second group is included in the served object group identifier, sends first authentication acknowledgement information to the first user equipment. In this way, the first user equipment can provide a relay service for only a particular group of served objects, thereby improving security of a relay service function.

An embodiment of the present invention provides a wireless network system. The wireless network system includes first user equipment, second user equipment, and a network device.

Optionally, in a first application scenario, the first user equipment is the first user equipment described in the embodiment corresponding to FIG. 7 or FIG. 8.

Alternatively, in a second application scenario, the network device is the network device described in the embodiment corresponding to FIG. 9 or FIG. 10.

According to the wireless network system provided in this embodiment of the present invention, first user equipment receives a served object group identifier sent by a network device, receives discovery information sent by second user equipment, and when determining that an identifier of a second group is included in the served object group identifier, establishes a connection between the first user equipment and the second user equipment according to a data link layer ID of the second user equipment and provides a relay service for the second user equipment. In this way, the first user equipment can provide a relay service for only a particular group of served objects, thereby improving security of a relay service function.

With descriptions of the foregoing embodiments, a person skilled in the art may clearly understand that the embodiments of the present invention may be implemented by hardware, firmware or a combination thereof. When the embodiments of the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible by a computer. The following is taken as an example but is not limited: The computer readable medium may include a RAM (random access memory), a ROM (read-only memory), an EEPROM (electrically erasable programmable read-only memory), a CD-ROM (compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (digital subscriber line) or wireless technologies such as infrared ray, radio and microwave, the coaxial cable, optical fiber/cable, twisted pair, DSL or wireless technologies such as infrared ray, radio and microwave are included in the definition of the medium. For example, a disk and a disc used by the embodiments of the present invention includes a CD (compact disc), a laser disc, an optical disc, a DVD disc (digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A connection establishment method comprising:
receiving, by a first user equipment, a served object group identifier sent by a network device, wherein the served object group identifier is used to indicate a first group of served objects for which the first user equipment provides a relay service;
receiving, by the first user equipment, discovery information from a second user equipment,
wherein the discovery information comprises a data link layer identity (ID) of the second user equipment and an identifier of a second group of served objects for which the second user equipment provides a relay service and a relay service request, the relay service request is used to request the relay service, and
wherein the identifier of the second group is used to indicate a group of user equipment to which the second user equipment belongs or a group of users to which a user of the second user equipment belongs; and
when the served object group identifier comprises the identifier of the second group, obtaining, by the first user equipment, the data link layer ID of the second user equipment from the discovery information, and establishing a connection between the first user equipment and the second user equipment according to the data link layer ID of the second user equipment.

2. The method according to claim 1, wherein before the receiving, by the first user equipment, the served object group identifier from the network device, the method further comprises:
sending, by the first user equipment, a service authorization request to the network device; and
wherein the receiving, by first user equipment, the served object group identifier from the network device comprises:
receiving, by the first user equipment, a service authorization response from the network device, wherein the service authorization response carries the served object group identifier.

3. The method according to claim 1, wherein before the receiving, by the first user equipment, the served object group identifier from the network device, the method further comprises:
receiving, by the first user equipment, a served object group name from the network device, wherein the served object group name corresponds to the served object group identifier; and
sending, by the first user equipment, discovery request information to the network device, wherein the discovery request information comprises the served object group name; and
wherein the receiving, by the first user equipment, the served object group identifier from the network device comprises:
receiving, by the first user equipment, discovery acknowledgement information from the network device, wherein the discovery acknowledgement information comprises the served object group identifier.

4. The method according to claim 1, wherein
the discovery information further comprises a name of the second user equipment, wherein the name of the second user equipment is used to identify the second user equipment;
wherein, before obtaining the data link layer ID of the second user equipment, the method further comprises:
sending, by the first user equipment, first authentication information to the network device, wherein the first authentication information carries the name of the second user equipment; and
wherein obtaining the data link layer ID of the second user equipment comprises:
receiving, by the first user equipment, first authentication acknowledgement information from the network device, wherein the first authentication acknowledgement information carries the data link layer ID of the second user equipment.

5. A connection establishment method comprising:
receiving, by a network device, first authentication information from a first user equipment, wherein the first authentication information comprises an identifier of a second group of served objects for which a second user equipment provides a relay service, and the identifier of the second group is used to indicate a group of user equipment to which a second user equipment belongs or a group of users to which a user of the second user equipment belongs;
obtaining, by the network device, a served object group identifier of the first user equipment, wherein the served object group identifier of the first user equipment is used to indicate a first group of served objects for which the first user equipment provides a relay service;
when the served object group identifier of the first user equipment comprises the identifier of the second group, sending, by the network device, first authentication acknowledgement information to the first user equipment, wherein the first authentication acknowledgement information is used to instruct the first user equipment to provide the relay service for the second user equipment; and
sending, by the network device, a data link layer identity (ID) of the second user equipment to the first user equipment, wherein the data link layer ID of the second user equipment is used to establish a connection between the first user equipment and the second user equipment.

6. A first user equipment comprising a processor, a memory, a bus, and a receiver, wherein the processor, the memory, and the receiver are connected to each other by using the bus;
the receiver is configured to cooperate with the processor to receive a served object group identifier from a network device, wherein the served object group identifier is used to indicate a first group of served objects for which the first user equipment provides a relay service;
the receiver is further configured to cooperate with the processor to receive discovery information from a second user equipment,
wherein the discovery information comprises a data link layer identity (ID) of the second user equipment an identifier of a second group of served objects for which the second user equipment provides a relay service and a relay service request, the relay service request is used to request the relay service, and the identifier of the second group is used to indicate a group of user equipment to which the second user equipment belongs or a group of users to which a user of the second user equipment belongs; and the processor is configured to, when the served object group identifier comprises the identifier of the second group received by the receiver, obtain the data link layer ID of the second user equipment from the discovery information, and establish a connection between the first user equipment and the second user equipment according to the data link layer ID of the second user equipment.

7. The first user equipment according to claim 6, wherein the first user equipment further comprises a transmitter configured to cooperate with the processor to send a service authorization request to the network device; and the receiver is further configured to cooperate with the processor to receive a service authorization response from the network device, wherein the service authorization response carries the served object group identifier.

8. The first user equipment according to claim 6, wherein the receiver is further configured to cooperate with the processor to receive a served object group name from the network device, wherein the served object group name corresponds to the served object group identifier;

the first user equipment further comprises a transmitter configured to cooperate with the processor to send discovery request information to the network device, wherein the discovery request information comprises the served object group name; and the receiver is further configured to cooperate with the processor to receive discovery acknowledgement information from the network device, wherein the discovery acknowledgement information comprises the served object group identifier.

9. The first user equipment according to claim 6, wherein the discovery information further comprises a name of the second user equipment, wherein the name of the second user equipment is used to identify the second user equipment;

the first user equipment further comprises a transmitter configured to cooperate with the processor to send first authentication information to the network device, wherein the first authentication information carries the name of the second user equipment; and the receiver is further configured to cooperate with the processor to receive first authentication acknowledgement information from the network device, wherein the first authentication acknowledgement information carries the data link layer ID of the second user equipment.

10. A network device comprising a processor, a memory, a bus, a receiver, and a transmitter, wherein the processor, the memory, the receiver, and the transmitter are connected to each other by using the bus;

the receiver is configured to cooperate with the processor to receive first authentication information from a first user equipment, wherein the first authentication information comprises an identifier of a second group of served objects for which the second user equipment provides a relay service, and the identifier of the second group is used to indicate a group of user equipment to which a second user equipment belongs or a group of users to which a user of the second user equipment belongs;

the processor is configured to obtain a served object group identifier of the first user equipment, wherein the served object group identifier of the first user equipment is used to indicate a group of served objects for which the first user equipment provides a relay service; and the transmitter is configured to, when the served object group identifier obtained by the processor comprises the identifier of the second group received by the receiver, cooperate with the processor to send (a) a data link layer identifier (ID) of the second user equipment and (b) first authentication acknowledgement information to the first user equipment, wherein the data link layer ID of the second user equipment is used to establish a connection between the first user equipment and the second user equipment and the first authentication acknowledgement information is used to instruct the first user equipment to provide the relay service for the second user equipment.

11. The connection establishment method according to claim 5, including:

receiving a service authorization request from the first user equipment; and sending a service authorization response to the first user equipment, wherein the service authorization response carries the served object group identifier.

12. The connection establishment method according to claim 5, including:

sending a served object group name to the first user equipment, wherein the served object group name corresponds to the served object group identifier;

receiving discovery request information from the first user equipment, wherein the discovery request information comprises the served object group name; and sending discovery acknowledgement information to the first user equipment, wherein the discovery acknowledgement information comprises the served object group identifier.

13. The connection establishment method according to claim 5, wherein the discovery information further comprises a name of the second user equipment, wherein the name of the second user equipment is used to identify the second user equipment;

receiving first authentication information from the first user equipment, wherein the first authentication information carries the name of the second user equipment; and sending first authentication acknowledgement information to the first user equipment, wherein the first authentication acknowledgement information carries the data link layer ID of the second user equipment.

14. The network device according to claim 10, wherein the receiver is further configured to cooperate with the processor to receive a service authorization request from the first user equipment; and the transmitter is further configured to cooperate with the processor to send a service authorization response to the user equipment, wherein the service authorization response carries the served object group identifier.

15. The network device according to claim 10, wherein the transmitter is further configured to cooperate with the processor to send a served object group name to the first user equipment, wherein the served object group name corresponds to the served object group identifier;

the receiver is further configured to cooperate with the processor to receive discovery request information from the user equipment, wherein the discovery request information comprises the served object group name; and the transmitter is further configured to cooperate with the processor to send discovery acknowledgement information to the first user equipment, wherein the discovery acknowledgement information comprises the served object group identifier.

16. The network device according to claim 10, wherein the discovery information further comprises a name of the second user equipment, wherein the name of the second user equipment is used to identify the second user equipment;

the receiver is further configured to cooperate with the processor to receive first authentication information from the first user equipment, wherein the first authentication information carries the name of the second user equipment; and the transmitter is further configured to cooperate with the processor to send first authentication acknowledgement information to the first user equipment, wherein the first authentication acknowledgement information carries the data link layer ID of the second user equipment.

\* \* \* \* \*